(12) United States Patent
Ohno et al.

(10) Patent No.: US 10,065,201 B2
(45) Date of Patent: Sep. 4, 2018

(54) PROCESSING NOZZLE AND OPTICAL MACHINING APPARATUS

(71) Applicant: TECHNOLOGY RESEARCH ASSOCIATION FOR FUTURE ADDITIVE MANUFACTURING, Tokyo (JP)

(72) Inventors: Hiroshi Ohno, Kanagawa (JP); Satoshi Tsuno, Kanagawa (JP); Yuji Sasaki, Kanagawa (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 0 days.

(21) Appl. No.: 15/120,001

(22) PCT Filed: Nov. 11, 2015

(86) PCT No.: PCT/JP2015/081726
§ 371 (c)(1),
(2) Date: Aug. 18, 2016

(87) PCT Pub. No.: WO2017/081766
PCT Pub. Date: May 18, 2017

(65) Prior Publication Data
US 2017/0266675 A1    Sep. 21, 2017

(51) Int. Cl.
*B05B 5/00* (2006.01)
*B05C 19/00* (2006.01)
(Continued)

(52) U.S. Cl.
CPC ............. *B05B 7/14* (2013.01); *B05B 7/228* (2013.01); *B05C 19/00* (2013.01); *C23C 24/10* (2013.01); *C23C 26/02* (2013.01)

(58) Field of Classification Search
USPC .......... 118/300, 302, 641–643, 308; 239/601
See application file for complete search history.

(56) References Cited

U.S. PATENT DOCUMENTS 6,122,564 A    9/2000  Koch et al.
8,117,985 B2 *  2/2012  Whitfield ............... C23C 26/02
                                                118/302

FOREIGN PATENT DOCUMENTS

JP    60-166474 U    11/1985
JP    1-232024 A      9/1989
(Continued)

OTHER PUBLICATIONS

International Search Report (ISR) dated Feb. 9, 2016 for International Application No. PCT/JP2015/081726.
(Continued)

*Primary Examiner* — Yewebdar T Tadesse
(74) *Attorney, Agent, or Firm* — Ladas & Parry LLP

(57) ABSTRACT

A branch location is arranged close to a nozzle, and the channel lengths are the same. A processing nozzle that includes a beam path for passing light from a light source and ejects a fluid containing a processing material from an ejection port includes a supply pipe that is arranged outside the beam path through which the light passes, and supplies the fluid, and a first branch pipe and a second branch pipe that supply the fluid from the supply pipe to the ejection port, and have the same total length. The first branch pipe includes a first bent portion having a first shape on an upstream side of the fluid, and a second bent portion having a second shape on a downstream side of the fluid, and the second branch pipe includes a third bent portion having the first shape on the upstream side of the fluid, and a fourth bent portion having the second shape on the downstream side of the fluid.

6 Claims, 9 Drawing Sheets

(51) Int. Cl.
    *B05B 7/16*     (2006.01)
    *B05B 7/14*     (2006.01)
    *B05B 7/22*     (2006.01)
    *C23C 26/02*     (2006.01)
    *C23C 24/10*     (2006.01)

(56) References Cited

FOREIGN PATENT DOCUMENTS

| JP | 11-775 A | 1/1999 |
| JP | 2002-519200 A | 7/2002 |
| JP | 2003-340583 A | 12/2003 |
| WO | 00/00921 A1 | 1/2000 |

OTHER PUBLICATIONS

Written Opinion (WO) dated Feb. 9, 2016 for International Application No. PCT/JP2015/081726.
http://www.aichi-sangyo.co.jp/products/trumpf/WorkingHead.html.
J-PlatPat English abstract of JP 11-775 A.
J-PlatPat English abstract of JP 1-232024 A.
J-PlatPat English abstract of JP 2003-340583 A.

\* cited by examiner

FIG. 4

| PART MODEL NUMBER | CURVATURE | LENGTH | MATERIAL | ... |
|---|---|---|---|---|
| A | | | | |
| B | | | | |
| C | | | | ... |
| ... | | | ... | ... |

401 — PART MODEL NUMBER
402 — CURVATURE
403 — LENGTH
404 — MATERIAL
400

| BRANCH PATH MODEL NUMBER | COMBINATION | JOINT ANGLE | ... |
|---|---|---|---|
| 00001 | A+A | 60 120 | |
| 00002 | A+B+A | 30 90 | |
| 00003 | A+B+C... | 270 180 | ... |
| ... | ... | ... | |

501 — BRANCH PATH MODEL NUMBER
502 — COMBINATION
503 — JOINT ANGLE
500

FIG. 5

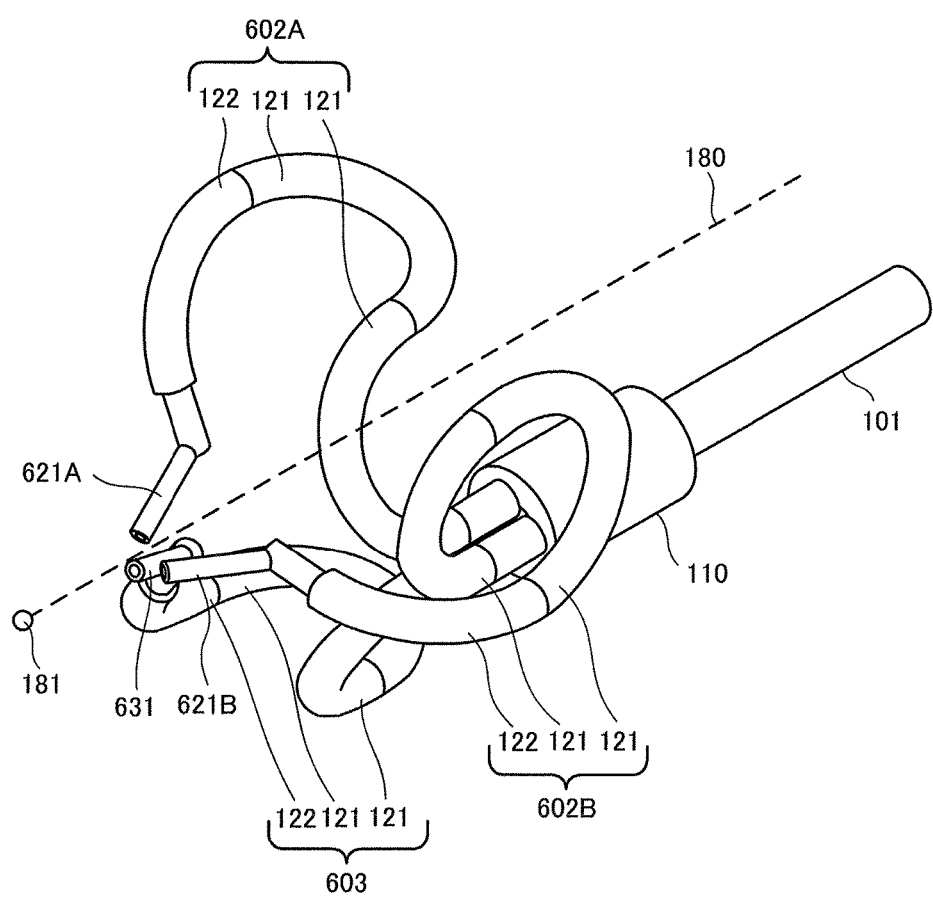
F I G. 6

PROCESSING NOZZLE AND OPTICAL MACHINING APPARATUS

RELATED APPLICATION

This application an application under 35 U.S.C. 371 of International Application No. PCT/JP2015/081726 filed on Nov. 11, 2015, the entire contents of which are incorporated herein by reference.

TECHNICAL FIELD

The present invention relates to a processing nozzle which irradiates a process surface with light, and performs shaping by ejecting a fluid containing a processing material to the irradiated portion.

BACKGROUND ART

In the abovementioned technical field, non-patent literature 1 has disclosed an optical machining apparatus in which three powder flows branched on the outside are supplied into a nozzle from the outside.

CITATION LIST

Non-Patent Literature

Non-patent literature 1: http://www.aichi-sangyo.co.jp/products/trumpf/WorkingHead.html

SUMMARY OF THE INVENTION

Technical Problem

In this technique described in the abovementioned literature, to give almost equal conductances to powder channels through which the three branched powder flows reach the nozzle, it is necessary to secure predetermined powder channels or more.

Accordingly, a branch location is positioned away from the nozzle, so the size of the whole apparatus readily increases in the vertical direction. Therefore, demands have arisen for an arrangement in which equal conductances can be given to powder channels from a branch location to a nozzle even when the branch location is arranged close to the nozzle.

The present invention enables to provide a technique of solving the above-described problem.

Solution to Problem

One aspect of the present invention provides a processing nozzle that includes a beam path for passing light from a light source and ejects a fluid containing a processing material from an ejection port, comprising:

a supply pipe that is arranged outside the beam path through which the light passes, and supplies the fluid; and a first branch pipe and a second branch pipe that supply the fluid from the supply pipe to the ejection port, and have the same total length, wherein the first branch pipe includes
a first bent portion having a first shape on an upstream side of the fluid, and
a second bent portion having a second shape on a downstream side of the fluid, and the second branch pipe includes
a third bent portion having the first shape on the upstream side of the fluid, and
a fourth bent portion having the second shape on the downstream side of the fluid.

Another aspect of the present invention provides a processing nozzle that performs processing by ejecting a fluid containing a processing material to a molten pool formed on a process surface by using light from a light source, comprising:

a supply pipe that is arranged outside a beam path through which the light passes, and supplies the fluid; and a first branch pipe, a second branch pipe, and a third branch pipe that supply the fluid from the supply pipe to the process surface, and have the same total length, wherein the first branch pipe includes
a first bent portion having a first shape on an upstream side, and
a second bent portion having a second shape on a downstream side, the second branch pipe includes
a third bent portion having the first shape on the upstream side, and
a fourth bent portion having the second shape on the downstream side, and the third branch pipe includes
a fifth bent portion having the first shape on the upstream side, and
a sixth bent portion having the second shape on the downstream side.

Still other aspect of the present invention provides a processing nozzle that includes a beam path for passing light from a light source and ejects a fluid containing a processing material, comprising:

a supply pipe that is arranged outside beam path through which the light passes, and supplies the fluid; and a first branch pipe, a second branch pipe, and a third branch pipe that supply the fluid from the supply pipe to the process surface, and have the same total length, wherein each of the first branch pipe, the second branch pipe, and the third branch pipe is formed by combining at least one of a plurality of semicircular pipes and a plurality of ¼-circular pipes in the same order of arrangement.

Still other aspect of the present invention provides an optical machining apparatus using the abovementioned processing nozzle.

Advantageous Effects of Invention

According to the present invention, a branch location can be positioned near a nozzle, and equal conductances can be given to powder channels from the branch location to the nozzle.

BRIEF DESCRIPTION OF DRAWINGS

FIG. 4 is a view for explaining examples of the part specifications of constituent parts of the branch paths of the processing nozzle according to the first embodiment of the present invention;

FIG. 5 is a view for explaining examples of combinations of the constituent parts of the branch paths of the processing nozzle according to the first embodiment of the present invention;

FIG. 6 is a schematic perspective view showing the arrangement of branch paths of a processing nozzle according to the second embodiment of the present invention;

DESCRIPTION OF THE EMBODIMENTS

Embodiments of the present invention will exemplarily be explained in detail below with reference to the accompanying drawings. Note that the arrangements, numerical values, procedures, functional elements, and the like described in the following embodiments are merely examples, are freely modifiable or changeable, and are not intended to limit the technical scope of the present invention to the following description.

[First Embodiment]

Figure 1A:
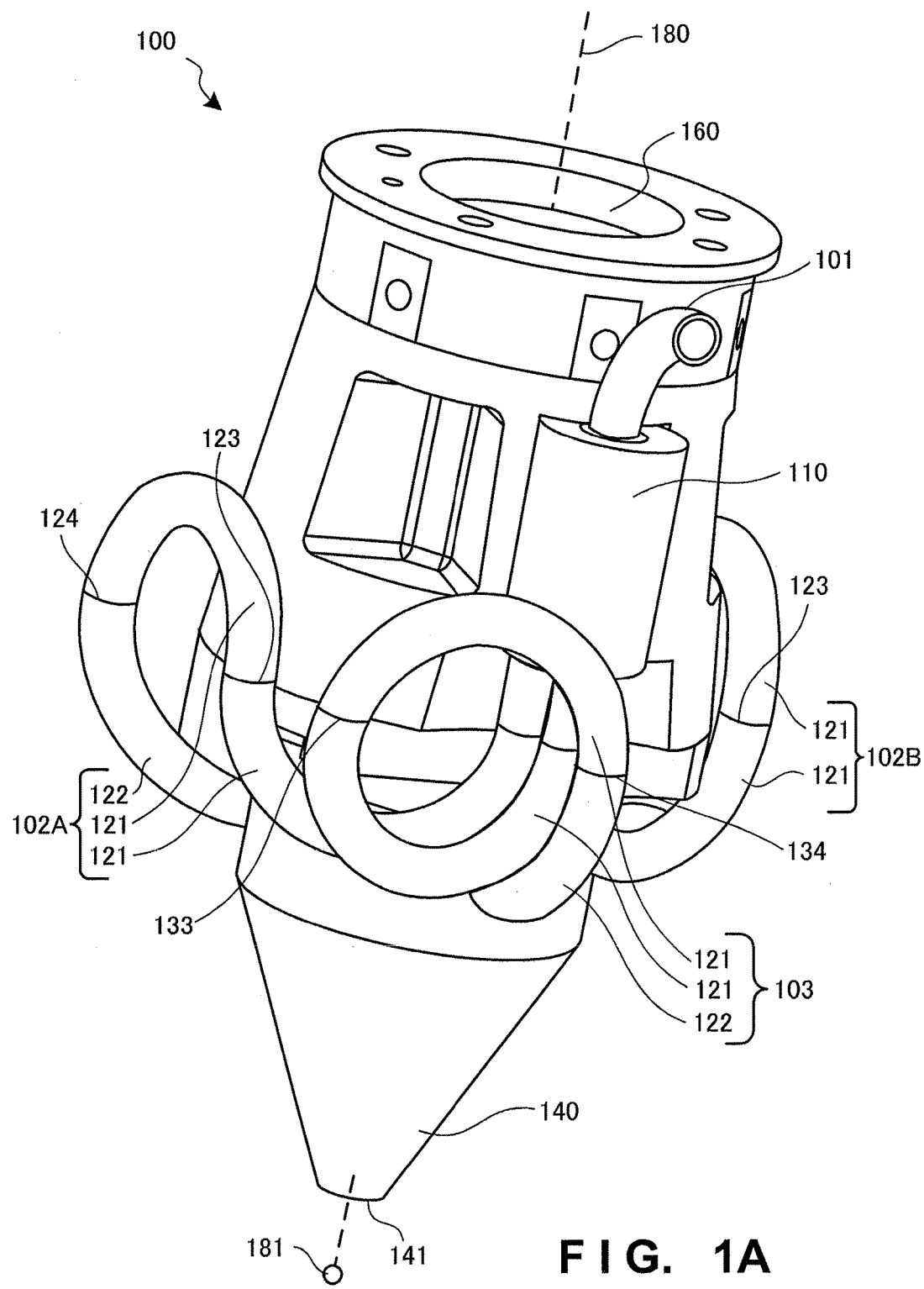
FIG. 1A is a schematic perspective view showing the overall arrangement of a processing nozzle according to the first embodiment of the present invention.
Figure 1B:
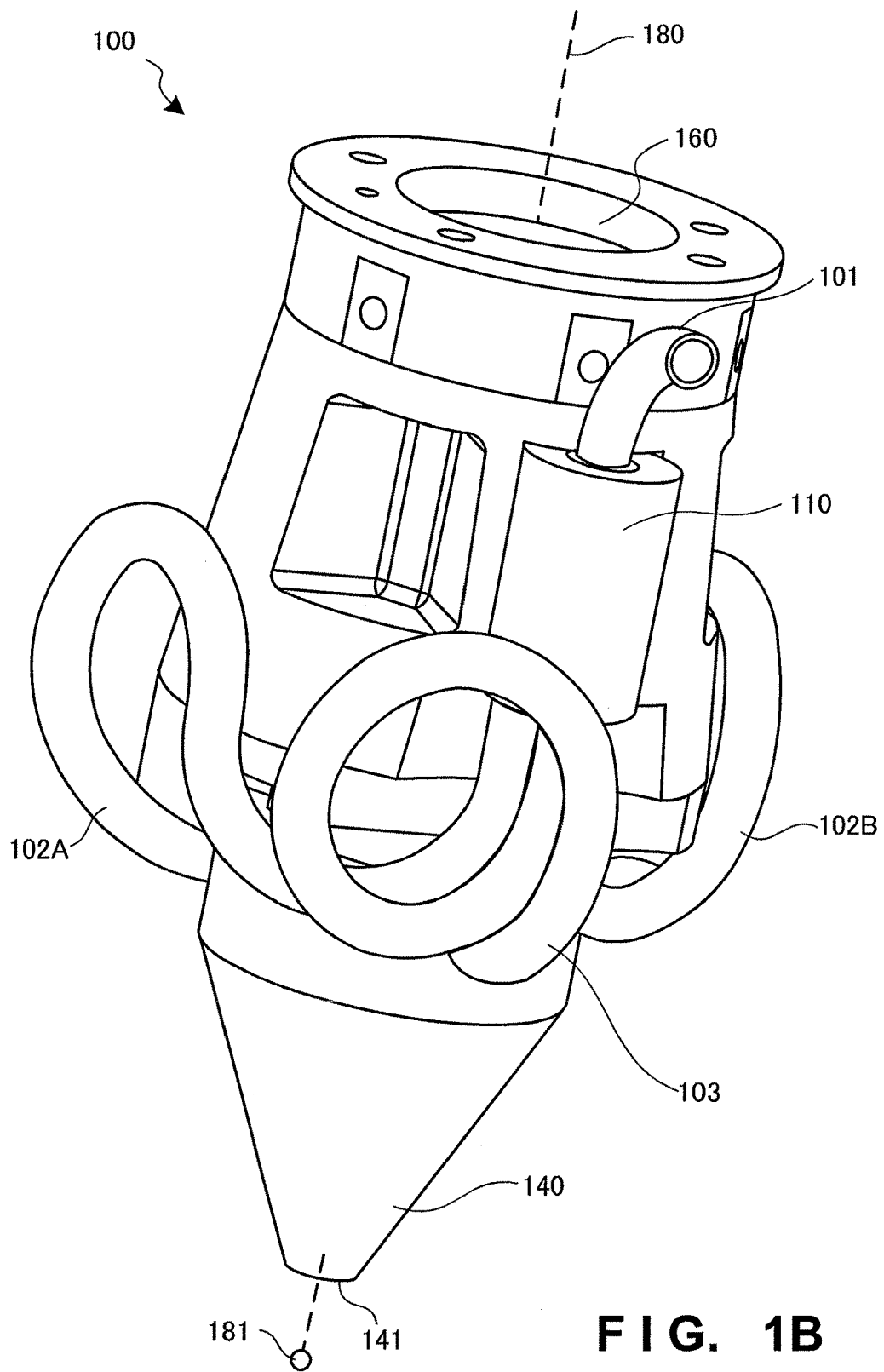
FIG. 1B is another schematic perspective view showing the overall arrangement of the processing nozzle according to the first embodiment of the present invention.
Figure 2:
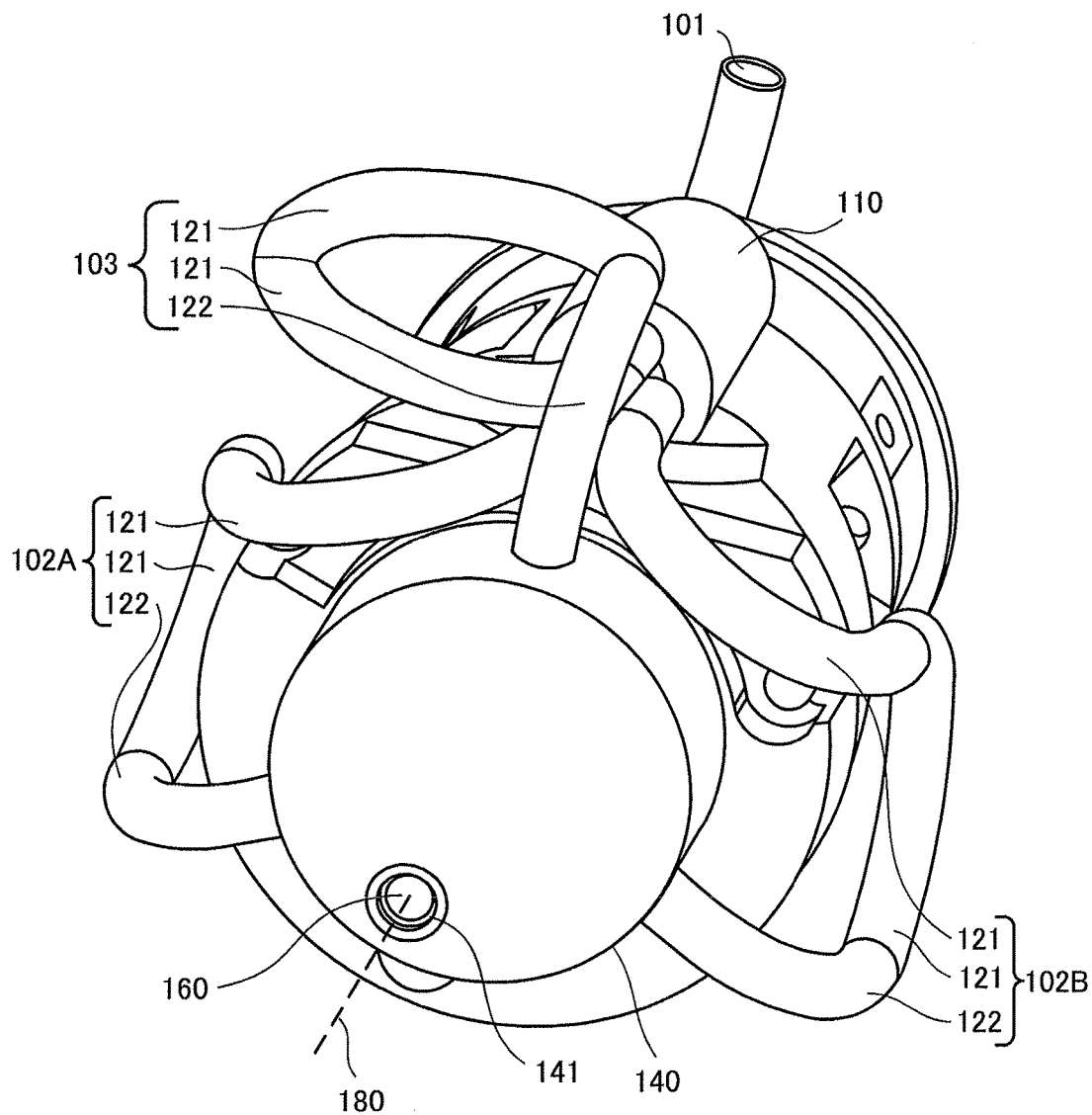
FIG. 2 is a schematic bottom view showing the arrangement of the processing nozzle according to the first embodiment of the present invention.

A processing nozzle as the first embodiment of the present invention will be explained with reference to FIGS. 1A to 4. FIG. 1A is a schematic perspective view showing the overall arrangement of a processing nozzle 100 according to this embodiment. FIG. 1B is another schematic perspective view showing the overall arrangement of the processing nozzle 100 according to this embodiment. FIG. 2 is a schematic bottom view for explaining the arrangement of the processing nozzle 100 according to this embodiment.

The processing nozzle 100 is a member which is attached to the distal end portion of a processing head of an optical machining apparatus, and supplies, to a processing point 181, a powder flow containing a powder as a material of a three-dimensional shaped object or the like. The processing head of the optical machining apparatus, to which the processing nozzle 100 is attached, melts the processing point 181 by condensing light to the processing point 181, and supplies a powder material contained in a powder flow 170 to the processing point 181, thereby forming a three-dimensional shaped object or performing overlay welding. The powder flow is obtained by mixing a metal powder or the like in an inert gas (a rare gas such as argon, helium, or nitrogen). However, the powder flow is not limited to this, and may also be prepared by mixing a material such as a metal powder or resin in a liquid such as water or liquid nitrogen.

As shown in FIG. 1, the processing nozzle 100 includes a supply pipe 101, and branch paths 102A, 102B, and 103. The supply pipe 101 and branch paths 102A, 102B, and 103 are tubular pipes. However, each branch path is not limited to a tubular member, and may also be a channel obtained by forming a gap or pore in a member such as a metal or resin. Therefore, these members will collectively be called pipes hereinafter.

The branch paths 102A, 102B, and 103 have the same total length. The branch path 102A has a straight portion in a portion joined to a branching portion 110. Although this straight portion is not always necessary, the straight portion has an effect of suppressing disturbance of a fluid immediately after the fluid is branched in the branching portion 110. In this embodiment, the supply pipe 101 is defined as the upstream side, and a direction in which the fluid flows toward an ejection port 141 is defined as the downstream side. The branch path 102A is formed by a plurality of pipe shapes from the upstream side to the downstream side. The "pipe shape" herein mentioned means a locus when a fluid flows through a pipe, i.e., means the flow line of a fluid. The arrangement will be explained below from the upstream side of the branch path 102A. First, the branch path 102A includes a semicircular pipe-shaped portion (a part 121) projecting downward through which the flow line moves nearer to a process surface and then moves away from it. Then, the part 121 is connected by a junction 123 to a semicircular pipe-shaped portion (a part 121) projecting upward through which the flow line moves away from the process surface and then moves nearer to it. After that, the branch path 102A is connected by a junction 124 to an arc-like (¼-circular) pipe-shaped portion (a part 122) in which the flow line has a central angle of 90°, through the semicircular pipe-shaped portion (the part 121) projecting upward. The pipe shapes described above are only the semicircular shape (the part 121) and the ¼-circular shape (the part 122), but the pipe shapes are not limited to them. That is, the pipe shape can be any curve.

Likewise, from the upstream side to the downstream side of the branch paths 102B and 103, semicircular pipe-shaped portions (parts 121) projecting downward are first connected by junctions 123 and 133 to semicircular pipe-shaped portions (parts 121) projecting upward. Then, the branch paths 102B and 103 are connected by junctions 124 and 134 to ¼-circular pipe-shaped portions (parts 122) through the semicircular pipe-shaped portions (parts 121) projecting upward.

In the branch paths 102A, 102B, and 103, the connecting directions are different in the joints between the pipe-shaped portions. However, the branch paths 102A, 102B, and 103 have the same total length, and the plurality of pipe shapes forming these branch paths are also sequentially identical from the upstream side.

The supply pipe 101 receives supply of the powder flow from a powder storage tank (not shown) or the like as a powder flow supply source. The powder flow having flowed into the supply pipe 101 and flowed through the supply pipe 101 enters the branching portion 110 after that. The powder flow having entered the branching portion 110 is branched into three flows in the branching portion 110, and the three branched powder flows enter the branch paths 102A, 102B, and 103.

Then, the powder flows having entered the three branch paths 102A, 102B, and 103 pass through the branch paths 102A, 102B, and 103. After that, the powder flows are guided to a nozzle housing 140, and enter the nozzle housing 140.

The powder flows having entered the nozzle housing 140 pass through a slit (not shown) formed inside the nozzle housing 140, and are ejected outside the nozzle housing 140 from the ejection port 141 at the distal end. Note that the slit is formed by a gap between coaxially arranged inner and outer cylinders incorporating a beam path 160. Each cylinder may also have a shape which is tapered along the beam path 160, e.g., a conical shape. In this case, the slit has an annular section in a section perpendicular to the beam path 160 (or the nozzle housing 140). This annular section is isotropic with respect to the beam path 160 (or the nozzle housing 140). This tapered shape has an effect of converging the powder material to the process surface along the beam path 160. In addition, since this slit is isotropic with respect to the beam path 160 (or the nozzle housing 140), fluid variations can be reduced by isotropically supplying the fluid into this slit, and the powder convergence on the process surface increases. That is, the powder convergence can be increased by making the flow velocity or flow rate of the fluid isotropic with respect to the beam path 160 (or the nozzle housing 140).

Portions where the three branch paths 102A, 102B, and 103 join the nozzle 140 are so arranged as to be rotationally symmetrical with respect to the central axis 180. "Rotationally symmetrical" herein mentioned means that when an object is rotated around a rotation axis, the object matches the original shape at a rotation angle of less than 360°. Note that in this embodiment, the number of branch paths is three, i.e., there are three branches. However, the number of branch paths is not limited to this. Note also that the number of branch paths can be either an odd number or even number. Furthermore, the beam path 160 and the slit formed in the nozzle housing 140 are also arranged to be rotationally symmetrical with respect to the central axis 180. When they are thus coaxially arranged with respect to the central axis 180, the beam condensation point and the powder convergence point on the process surface can be matched. This effectively improves the efficiency of powder utilization.

As shown in FIG. 2, the branch paths 102A and 102E form a reflection-symmetrical shape with respect to a plane including the central axis 180, but the branch paths 102A and 103 have different shapes. Similarly, the branch paths 102B and 103 have different shapes.

Next, the shapes of the branch paths 102A, 102B, and 103 will be explained. Note that in this embodiment, the flow inlet and flow outlet of each channel are defined such that the upstream side of the flowing of the powder flow 170 is the flow inlet, and the downstream side is the flow outlet. Let s (a path distance) be the distance from the flow inlet (entrance) of the supply pipe 101 of the powder flow to an arbitrary position (point or place) on the branch path 102A, 102B, or 103. Also, the direction vector of the branch path 102A, 102B, or 103 at that position is:

$\vec{e}(s)$ where the direction of the vector is upstream→downstream.

In this case, a curvature K of the branch path 102A, 102B, or 103 at the path distances is:

$$K = \left| \frac{\vec{e}(s)}{ds} \right| \quad (1)$$

Assume that the direction vector of the branch path 102A at the path distance s is:

$\vec{e}_1(s)$ and the direction vector of the branch path 103 or 102B at the path distance s is: $\vec{e}_2(s)$ In this case, there is at least one path distance s which satisfies:

$$\vec{e}_1(s) \ne \vec{e}_2(s) \quad (2)$$

because the branch paths 102A and 103 or the branch paths 102A and 102B have different shapes. Also, at an arbitrary path distance s, the following expression is satisfied at the same time:

$$\left| \frac{d\vec{e}_1(s)}{ds} \right| = \left| \frac{d\vec{e}_2(s)}{ds} \right| \quad (3)$$

Note that all the total lengths of the branch paths 102A, 102B, and 103 are the same. From the above-described conditions, there is at least one path distance s which simultaneously satisfies expressions (2) and (3).

Note that when the branch paths 102A, 102B, and 103 are formed by parts connected at a junction point, these parts are joined as they are relatively rotated so that expressions (2) and (3) hold even at the path distance s to the junction point.

When the branch paths 102A, 102B, and 103 are formed under the conditions as described above, it is possible to equalize the conductances of the branch paths from the branching portion 110 to the flow inlet (entrance) to the nozzle housing 140, i.e., the conductances of the branch paths 102A, 102B, and 103. This is so because expression (3) holds, and hence the curvatures of these branch paths are equal at an arbitrary path distance s. The flow velocity of the fluid flowing through the branch path depends on the curvature of the branch path. Therefore, fluids equally branched by the branching portion 110 have the same flow velocity at an arbitrary path distance s in the individual branch paths. In addition, when the sectional areas of these branch paths, which are perpendicular to the flow-line direction, are equal, the flow rates of the individual fluids can also be equalized.

The flowing of the powder flow from supply from the supply pipe 101 to ejection from the ejection port 141 will now be explained.

The powder flow is supplied into the supply pipe 101 from the flow inlet (entrance) of the supply pipe 101, and branched into three flows in the branching portion 110. The branching portion 110 has a rotationally symmetrical shape, and has a cylindrical housing or the like. The branching portion 110 includes three rotationally symmetrical channels in which the channel extending from the supply pipe 101 is branched into three channels. Since the flow inlets to the three branch paths 102A, 102B, and 103 are so arranged as to be rotationally symmetrical with respect to the rotation-symmetry axis of the branching portion 110, the powder flow can equally be branched into three flows in the branching portion 110.

By contrast, if the three branch paths 102A, 102B, and 103 have the same shape, the end portions of the branch paths 102A, 102B, and 103 cannot be arranged to be rotationally symmetrical with respect to the central axis 180 at the flow outlets of these branch paths.

Accordingly, the shapes of at least one combination of the branch paths must be different. That is, aforementioned expression (2) must hold for at least one combination of the branch paths 102A, 102B, and 103.

The curvatures of the branch paths 102A, 102B, and 103 are equal at an arbitrary path distance s, so expression (3) holds. This makes it possible to equalize the flow velocities of the branch paths 102A, 102B, and 103 at an arbitrary path distance s. That is, the flow velocities at the end portions of the branch paths 102A, 102B, and 103 can be equalized. Accordingly, the powder flow in the nozzle housing 140 can be made isotropic with respect to the beam path 160, so the flow velocity branch variation reduces, and the powder convergence of the powder flow at the processing point 181 improves. That is, the powder convergence can be increased because the fluid can isotropically be supplied into the slit formed in the nozzle housing 140 and isotropic to the beam path 160. It is also possible to equalize the flow rates of the fluids in the branch paths 102A, 102B, and 103 at an arbitrary path distance s by equalizing the sectional areas perpendicular to the flow-line direction. Since this can reduce the flow rate branch variation as well, the powder convergence of the powder flow at the processing point 181 improves.

That is, the branch paths 102A, 102B, and 103 have different shapes. Therefore, even when the branching portion 110 is not arranged on the central axis 180 but arranged in a position apart from the central axis 180, the three branch paths 102A, 102B, and 103 connected to the branching portion 110 can be arranged such that the flow outlets of these branch paths are rotationally symmetrical with respect to the central axis 180, in the end portions (the flow outlets, exits, or the downstream ends of the branch paths), i.e., in portions connected to the nozzle housing 140.

This makes it possible to isotropically supply the powder flow with respect to the nozzle housing 140 and central axis 180. Consequently, the powder flow is made isotropic in the nozzle housing 140, the branch variation caused when the powder flow is branched into three flows reduces, and the powder convergence at the processing point 181 improves.

In addition, the number of branch paths is three, i.e., an odd number, so the powder flows flowing into the nozzle housing 140 do not frontally collide against each other in the nozzle housing 140. This can reduce the occurrence of turbulence, and improve the powder convergence.

The light beam is emitted from an optical system (not shown), and condensed through the beam path 160 to the processing point 181 or a region including the processing point 181 and having a predetermined area. In addition, an inert gas (a rare gas such as argon, helium, or nitrogen) also flows along the beam path 160. This inert gas prevents oxidation of the processing point 181, and prevents a foreign body such as fume scattering from the processing point 181 from entering the processing nozzle 100.

FIG. 1B is another schematic perspective view showing the overall arrangement of the processing nozzle 100 according to this embodiment, and shows an embodiment in which the branch paths 102A, 102B, and 103 are integrally molded. Note that the same reference numerals as in FIG. 1A denote the same constituent elements in FIG. 1B, and a repetitive explanation thereof will be omitted.

Figure 3:
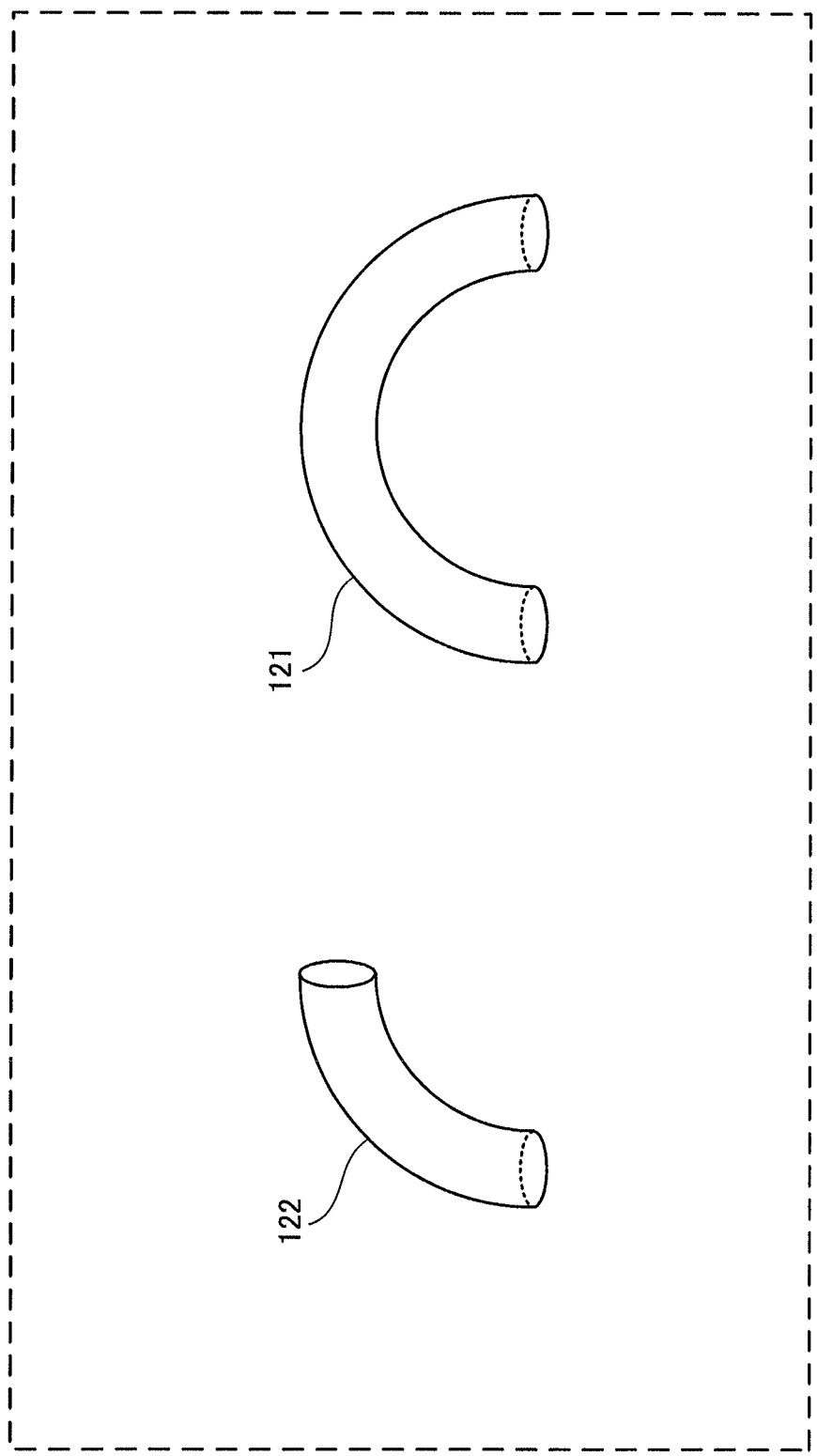
FIG. 3 is a view for explaining examples of constituent parts of branch paths of the processing nozzle according to the first embodiment of the present invention.

FIG. 3 is a view for explaining examples of the constituent parts of the branch paths of the processing nozzle 100 according to this embodiment. Each of the branch paths 102A, 102B, and 103 is formed by combining the parts 122 and 121 shown in FIG. 3. For example, the branch path 102A (102B) is formed by combining the part 122 as a ¼-circular pipe member, and the part 121 as a semicircular pipe member. More specifically, the branch path 102A (102B) can be manufactured by connecting the parts 121, 121, and 122 in this order. Also, the branch path 103 can be manufactured by connecting the parts 122 and 121 in the same order. However, the branch paths 102A, 102B, and 103 are different from each other in joint angle at the joint between the parts 122 and 121. That is, at the joint as a portion where one part connects to a next part, the relative positions of the two parts are different although the joint is the same. Also, the joint angle means the relative rotation angle of a part with respect to an axis which is a normal line of a plane including the joint.

Note that a straight pipe may also be used in the joint of parts. By thus forming a straight portion in a joint portion of the branch path, disturbance of the powder flow in the joint portion can be reduced. It is also possible to reduce the occurrence of turbulence caused by a resistance generated by an abrupt change in direction of the powder flow in the joint of parts.

This embodiment has been explained by taking an example in which each of the branch paths 102A, 102B, and 103 is manufactured by using the part 122 which is a ¼-circular (an arc shape having a central angle of 90°) pipe, and the part 121 which is a semicircular (an arc shape having a central angle of 180°) pipe. However, a pipe usable as a part is not limited to the ¼-circular pipe and semicircular pipe. That is, it is also possible to use a 1/N-circular pipe (N is a positive real number), and a pipe having an arbitrary curvature. Furthermore, a straight pipe may also be used as a part.

When the branch paths 102A, 102B, and 103 are thus manufactured by appropriately adjusting the angle of the joint portion by using the common parts 122 and 121, assembling of these branch paths is facilitated. Also, a deviation of the conductance of the completed branch path from a target value decreases, and the product accuracy variation reduces.

Note that in the above-described explanation, an example in which each of the branch paths 102A, 102B, and 103 is manufactured by using the parts 122 and 121 has been explained. However, each branch path may also be integrally molded without being divided into parts.

FIG. 4 is a view for explaining examples of the part specifications of constituent parts of the branch paths of the processing nozzle 100 according to this embodiment. Part specifications 400 show a curvature 402, length 403, and material 404 in association with a part model number 401. Typical examples of the material 404 are plastic and a metal. By thus preparing parts having various curvatures, the user can manufacture branch paths having various shapes by appropriately combining these parts.

FIG. 5 is a view for explaining combination examples of the constituent parts of the branch paths of the processing nozzle 100 according to this embodiment. Part combinations 500 show, in association with a branch path model number 501, a combination 502 of parts necessary to manufacture the branch path model number 501, and a joint angle 503 at the joint of the parts. The joint angle means the relative rotation angle of a part with respect to an axis which is a normal line of a plane including the joint. Therefore, the user can manufacture a desired branch path with reference to the part combinations 500.

In this embodiment, the powder flow is branched into three flows, so the powder flows flowing into the nozzle housing 140 do not frontally collide against each other. This makes it possible to reduce the occurrence of turbulence, and improve the powder convergence. Also, since the flow velocity of the powder flow in the nozzle housing is made isotropic with respect to the beam path 160, the branch variation reduces, and the powder convergence of the powder flow at the processing point improves. In addition, the direction of the powder flow is made isotropic with respect to the beam path 160 in the nozzle housing, so the branch variation caused when the powder flow is branched into three flows reduces. Accordingly, the powder convergence at the processing point improves. Furthermore, unlike in a conventional apparatus, it is unnecessary to almost equalize the branch paths from the branch location to the nozzle housing 140 by arranging the branch location far away. Therefore, it is possible to arrange the branch location near the nozzle, and equalize the channel lengths.

[Second Embodiment]

Figure 7:
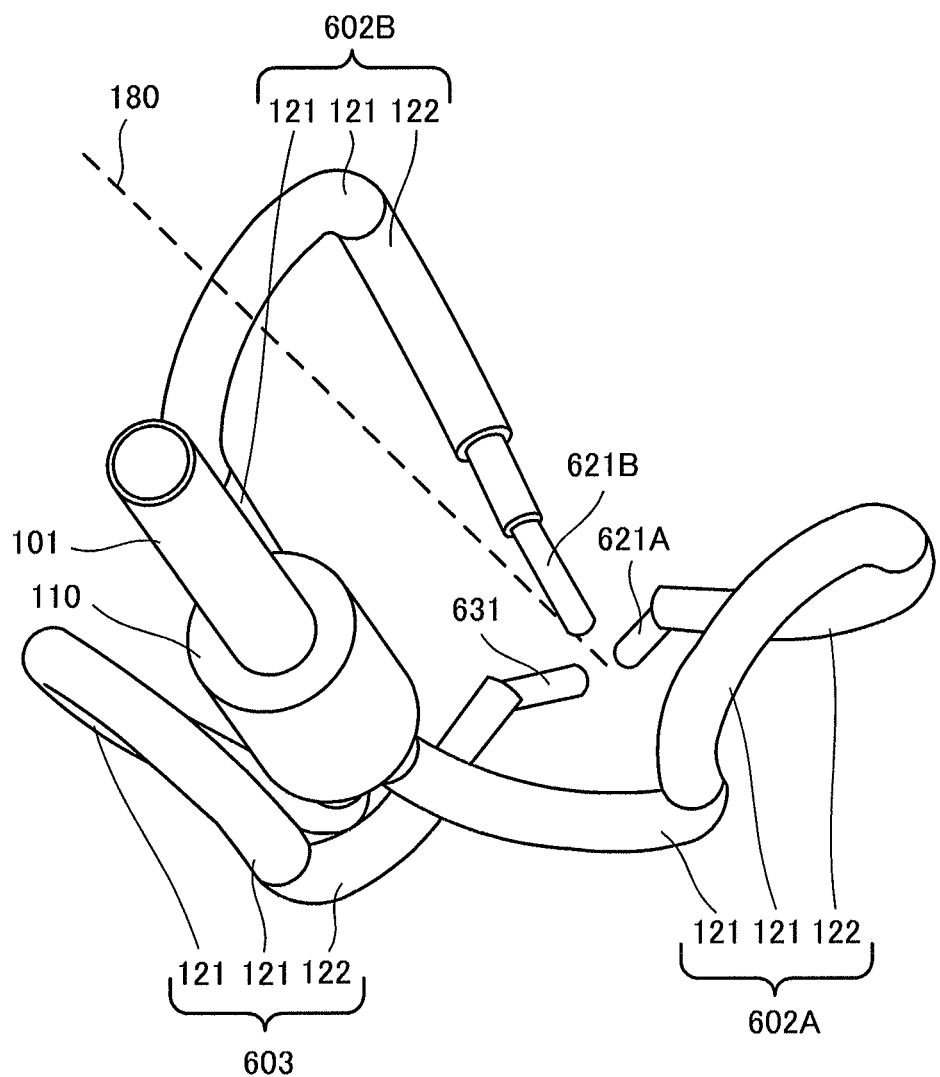
FIG. 7 is a schematic plan view showing the arrangement of the branch paths of the processing nozzle according to the second embodiment of the present invention.

A processing nozzle according to the second embodiment of the present invention will be explained below with reference to FIGS. 6 and 7. FIG. 6 is a schematic perspective view showing the arrangement of branch paths of the processing nozzle according to this embodiment. FIG. 7 is a schematic plan view showing the arrangement of the branch paths of the processing nozzle according to this embodiment. A processing nozzle 600 according to this embodiment differs from the abovementioned first embodiment in that the branch path has an ejection port. The rest of the arrangement and the operation are the same as those of the first embodiment, so the same reference numerals denote the same parts and the same operations, and a detailed explanation thereof will be omitted. Also, members and the like other than the branch paths are properly omitted from FIGS. 6 and 7 in order to avoid these drawings from being complicated.

Branch paths 602A, 602B, and 603 have ejection ports 621A, 621B, and 631 in the end portions (the sides close to a processing point 181) of the paths. That is, the second embodiment is a three-beam-type nozzle in which the branch paths 602A, 602B, and 603 are not connected to a nozzle housing 140. Powder flows are directly ejected to the processing point 181 from the branch paths 602A, 602B, and 603.

In this embodiment, the ejection port is formed in the end portion (the side close to the processing point) of each branch path, so the powder flows passing through the branch paths are not mixed. This can prevent turbulence which occurs when the powder flows are mixed. Also, the structure can be simplified because no slit needs to be formed in the nozzle housing 140.

[Third Embodiment]

Figure 8:
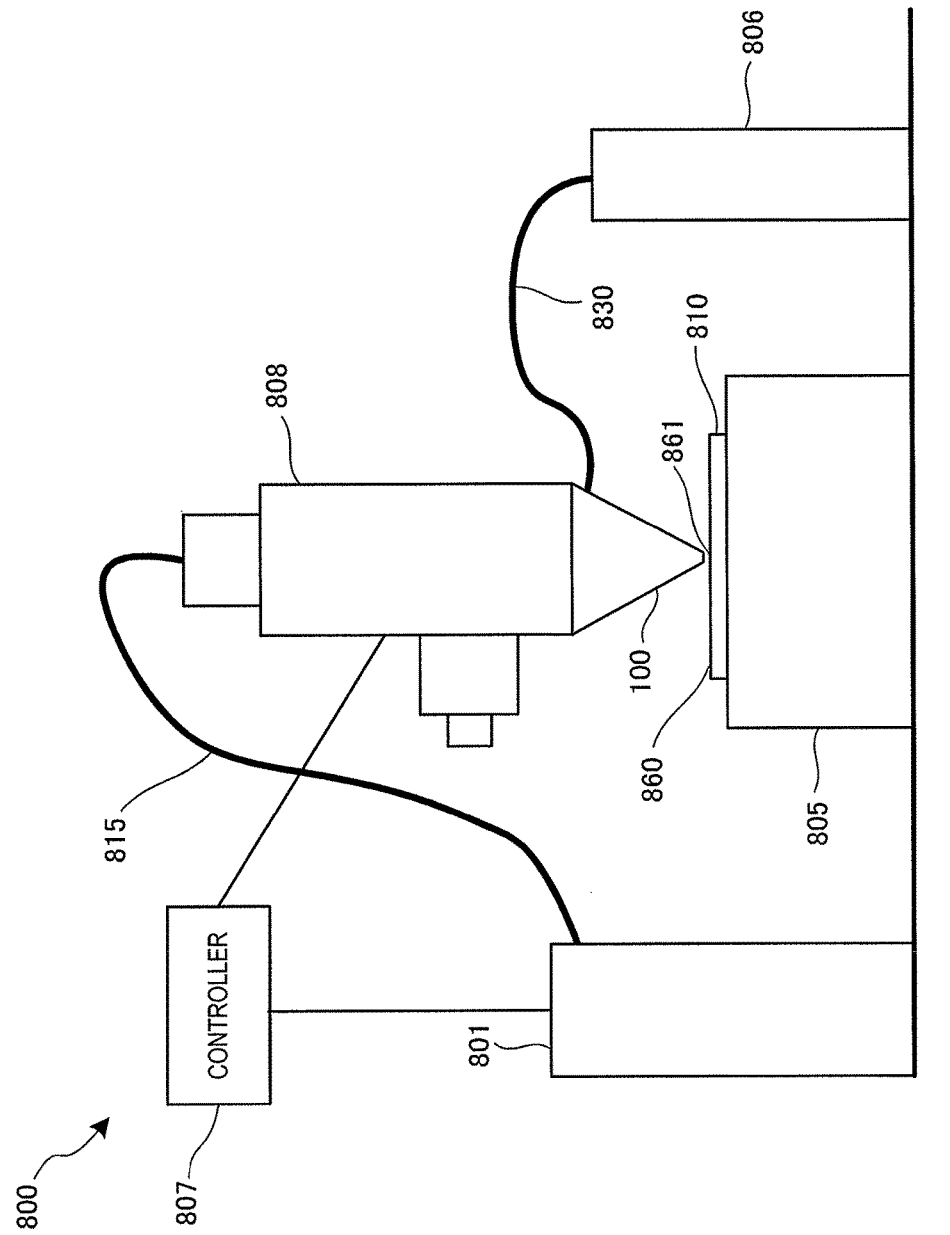
FIG. 8 is a view for explaining the arrangement of an optical machining apparatus according to the third embodiment of the present invention.

An optical machining apparatus according to the third embodiment of the present invention will now be explained with reference to FIG. 8. FIG. 8 is a view for explaining the arrangement of an optical machining apparatus 800 according to this embodiment. The optical machining apparatus 800 is an apparatus that includes the processing nozzle 100 explained in the above-described embodiments, and forms a three-dimensional shaped object or performs overlay welding by melting a material contained in a powder flow by heat generated by condensed light.

<<Apparatus Arrangement>>

The optical machining apparatus 800 includes a light source 801, a light transmitter 815, a stage 805, a material storage device 806, a material supplier 830, a processing head 808, and a controller 807.

The light source 801 is a laser source here, but can be an LED (Light Emitting Diode), a halogen lamp, or xenon lamp. The light beam to be used to melt a material is not limited to the laser beam, and can be any light beam as long as the light beam can melt a powder material at a processing point. For example, the light beam may be an electron beam, a microwave, or an electromagnetic wave in the ultraviolet range.

The light transmitter 815 is, for example, an optical fiber having a core diameter of ϕ0.01 to 1 mm, and guides light generated by the light source 801 to the processing head 808.

The material storage device 806 supplies a material-containing carrier gas to the processing head 808 via the material supplier 830. The material is, for example, a particle such as a metal particle or a resin particle. The carrier gas is an inert gas and can be, for example, argon gas, nitrogen gas, or helium gas.

The material supplier 830 is, for example, a resin or metal hose, and guides, to the processing head 808, a powder flow prepared by mixing a material in a carrier gas. Note that the carrier gas is unnecessary if the material is a wire.

The processing head 808 incorporates a condensing device that condenses light serving as the light beam. The processing nozzle 100 is attached downstream of the condensing device. A laser beam supplied to the processing head 808 is adjusted to be condensed on a process surface 860 through an optical system formed from a lens provided inside and the like. The laser beam irradiates the process surface 860 through the inside of the processing nozzle 100. The optical system is provided to be able to control the condensing position by controlling the lens interval or the like.

The controller 807 receives a shaping condition such as fine writing or bold writing, changes the output value of a laser beam from the light source 801 in accordance with the received shaping condition, and slides the outer housing of the processing nozzle 100. By this processing, the controller 807 controls the powder spot diameter of a powder to be ejected from the processing nozzle 100 in accordance with the molten pool diameter.

<<Apparatus Operation>>

Next, the operation of the optical machining apparatus 800 will be explained. A shaped object 810 is created on the stage 805. Light emitted by the processing head 808 is condensed to the process surface 860 on the shaped object 810. The temperature of the process surface 860 is raised by the condensed light, and the process surface 860 is melted, partially forming a molten pool.

The material is ejected from the processing nozzle 100 to a molten pool 861 of the process surface 860. The material is melted into the molten pool 861. After that, the molten pool 861 is cooled and hardened to deposit the material on the process surface 860, implementing three-dimensional shaping.

In this embodiment, highly accurate optical machining can be performed because a processing nozzle having a high powder convergence is used.

[Other Embodiments]

The present invention has been explained above with reference to the embodiments. However, the present invention is not limited to those embodiments. Various changes understandable by those skilled in the art within the scope of the present invention can be made for the arrangements and details of the present invention. The present invention also incorporates a system or apparatus that somehow combines different features included in the respective embodiments.

The invention claimed is:

1. A processing nozzle that includes a beam path for passing light from a light source and ejects a fluid containing a processing material from an ejection port, comprising:
   a supply pipe that is arranged outside said beam path through which the light passes, and supplies the fluid; and
   a first branch pipe and a second branch pipe that supply the fluid from said supply pipe to said ejection port in a flow direction, and have the same total length,
   wherein
   said first branch pipe includes:
   a first bent portion having a first shape on an upstream side of the flow direction of the fluid; and
   a second bent portion having a second shape on a downstream side of the flow direction of the fluid, and said second branch pipe includes:
a third bent portion having the first shape on the upstream side of the flow direction of the fluid;
a fourth bent portion having the second shape on the downstream side of the flow direction of the fluid,
said first bent portion and said third bent portion have a first radius of curvature and a first length,
said second bent portion and said fourth bent portion have a second radius of curvature and a second length,
in said first branch pipe and said second branch pipe, direction vectors of the first branch pipe and the second branch pipe represented by:

$$\vec{e}_1(s)$$

$$\vec{e}_2(s)$$

are different in at least a position in which a distance s in said first branch pipe is equal to a distance s in said second branch pipe, the distance s is a distance from a flow inlet of the supply pipe to an arbitrary position on said first branch pipe and said second branch pipe, and
changes in absolute values of the direction vectors represented by:

$$\left| \frac{d\vec{e}_1(s)}{ds} \right| = \left| \frac{d\vec{e}_2(s)}{ds} \right| \tag{3}$$

are equal at the arbitrary position of the distance s.

2. The processing nozzle according to claim 1, wherein positions of ends of said first branch pipe and said second branch pipe on the downstream side are arranged to be rotationally symmetrical around said beam path.

3. The processing nozzle according to 1, further comprising:
an inner cylinder including said beam path; and
an outer cylinder including said inner cylinder,
wherein downstream ends of said first branch pipe and said second branch pipe are connected to a channel formed by said inner cylinder and said outer cylinder.

4. The processing nozzle according to 1, wherein downstream ends of said first branch pipe and said second branch pipe open toward the process surface.

5. The processing nozzle according to 1, wherein the processing nozzle comprises an odd number of branch pipes.

6. An optical machining apparatus using a processing nozzle cited in 1.

* * * * *